United States Patent [19]
McCracken et al.

[11] Patent Number: 5,253,885
[45] Date of Patent: Oct. 19, 1993

[54] STAIRWAY DESCENDING PATIENT CARRIAGE

[76] Inventors: Jamie L. McCracken; Kathy L. Goff, both of 3824 N. Airport Dr., Stillwater, Okla. 74075

[21] Appl. No.: 970,740
[22] Filed: Nov. 2, 1992
[51] Int. Cl.$^5$ .............................................. B62B 13/16
[52] U.S. Cl. ........................................ 280/20; 280/19; 280/5.2; 297/357
[58] Field of Search ............... 280/32, 32.6, 5.2, 5.22, 280/5.24, 14.1, 18, 18.1, 19, 20, 28; 297/357, 378

[56] References Cited

U.S. PATENT DOCUMENTS

| | | | |
|---|---|---|---|
| 1,218,519 | 3/1917 | Bradley | 280/32.6 X |
| 2,175,748 | 10/1939 | Dunn | 280/18 X |
| 3,199,887 | 8/1965 | McKelvey | 280/18 |
| 3,600,000 | 8/1971 | Bergstrom et al. | 280/18 |
| 3,912,290 | 10/1975 | Rich | 280/20 X |
| 4,136,888 | 1/1979 | Bowie, Jr. et al. | 280/5.22 |
| 4,473,234 | 9/1984 | Egen | 280/5.22 |
| 4,688,813 | 8/1987 | Misawa et al. | 280/5.22 |
| 4,909,524 | 3/1990 | Paine | 280/32.6 X |

FOREIGN PATENT DOCUMENTS

| | | | |
|---|---|---|---|
| 1049321 | 10/1983 | U.S.S.R. | 280/20 |
| 1311987 | 5/1987 | U.S.S.R. | 280/20 |

*Primary Examiner*—Brian Johnson
*Attorney, Agent, or Firm*—Robert K. Rhea

[57] ABSTRACT

A carriage for rescuing patients is formed by a flat bottom rectangular frame having upstanding side walls, a rear wall, and a forwardly and upwardly inclined front wall. The frame is transversely divided by a partition to form a rearward seat area and a forward leg supporting area. A series of hingedly connected panels extending longitudinally of the frame define a back support portion, seat support panels, and flexed leg position supporting panels at the forward end of the frame. Flexible straps connected with the frame secure a patient therein and provide frame controls for an operator moving a carriage down a stairway at a selected rate of descent.

3 Claims, 3 Drawing Sheets

STAIRWAY DESCENDING PATIENT CARRIAGE

BACKGROUND OF THE INVENTION

This invention relates to rescue devices and more particularly to a carriage for moving an incapacitated person down a stairway.

1. Field of the Invention

Some individuals working or living at high elevations in buildings are unable to travel stairways and must rely on elevators in the building for moving from floor to floor. Fire restrictions prohibit elevator use in the event of fire, bomb threats, explosions, blackouts, or other emergency conditions in most buildings. When the stairs must be relied upon as the sole means of escape in the event of an emergency, there are, in most circumstances, able bodied individuals present who can assist those who require help in descending stairs.

This invention relates to an improved carriage for providing such assistance.

2. Description of the Prior Art

U.S. Pat. No. 4,473,234, issued Sep. 25, 1984, to Egen, for Carriage for Traversing Stairs discloses a seat with an upright back supported at its sides upon two support units comprising an endless belt which extends along a rigid longitudinal frame around two pulleys mounted upon horizontal axes at the opposite ends of the frames.

The belts extending around these pulleys form two longitudinal runs between the pulleys and act as a brake to retard movement of the frame down a stairway under the control of an operator grasping a pair of handles extending upward from the chair back.

U.S. Pat. No. 4,688,813, issued Aug. 25, 1987, to Misawa et al, for Carrier for Rescuing Patients describes a frame having a pair of lower horizontal portions and upwardly inclined portions adjacent to the horizontal portions at their rearward ends.

Pairs of front and rear wheels on the frame support a pair of crawlers engaged with the frame for contacting stairs as the device is moved downwardly under the control of an operator grasping the upright seat back portion. A centrifugal brake is provided for slowing the rotation of either the front or rear wheels to keep the carriage under control in traversing a stairway. Traveling wheels are mounted on the frame for moving the carrier across a flat service.

This invention is believed distinctive over these and other similar patient rescuing carriages by providing a low profile toboggan type carriage for moving a patient down a stairway under the control of one or two operators.

In this respect, U.S. Pat. No. 3,199,887, issued Aug. 10, 1965, to McKelvey for Sled, and U.S. Pat. No. 3,600,000, issued Aug. 17, 1971, to Bergstrom for a Security Device for Sled are believed to represent the state-of-the-art of toboggan type sleds which are similar in some respects to the present invention.

SUMMARY OF THE INVENTION

A generally rectangular section of rigid sheet material forms a flat bottom frame surface bounded by coextensive upstanding side walls, a rear end wall and a forwardly and upwardly inclined front wall having an upstanding foot stop at its upper limit.

Flexed leg supporting, hingedly connected and foldable panels occupy the major forward end portion of the device defining a rearward seat portion. A removable back panel hingedly connected with folding seat panels and the flexed panels, extends upward and rearwardly from the seat portion when in use and is foldable over the flexed leg supporting portion when in a collapsed stored position.

An elongated length of padding overlies the leg, seat, and back support section of the device. Flexible bands or straps secured to respective sides of the frame retain a patient thereon and other flexible members at the forward and rearward ends of the frame provide operator controls of the patient occupied carriage when descending a stairway.

The principal object of this invention is to provide a low profile toboggan type carriage for an incapacitated person when descending a stairway.

An additional object is to provide a patient carriage of minimum weight and maximum rigidity for strength and safe use which features a planar low coefficient of sliding friction bottom surface to minimize snagging on minor obstructions in descending a stairway, across a stair landing or other horizontal surface and in which the carriage is partially collapsible to occupy a minimum of space when not in use.

DESCRIPTION OF THE PREFERRED EMBODIMENTS

Figure 6:
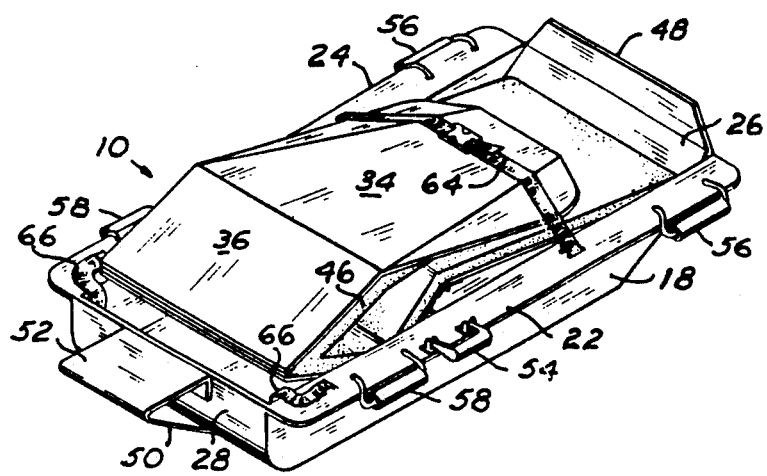

Like characters of reference designate like parts in those figures of the drawings in which they occur.

In the drawings:

The reference numeral 10 indicates the carriage as a whole comprising a toboggan type frame 12 and hingedly connected panel means 14 for supporting an occupant which includes hingedly connected foldable panels forming seat, back, and flexed leg support portions fitting between lateral limits of the frame as described hereinbelow.

The sled-like frame portion 12 is preferably formed from substantially uniform thickness rigid light-weight sheet material such as plastic to define an elongated rectangular flat bottom portion 16 having coextensive upstanding side walls 18 and 20 turned laterally outward at their upper limit to define horizontal laterally projecting flanges 22 and 24.

The forward end portion of the bottom is inclined upwardly to define an inclined forward wall 26 disposed at an acute angle with respect to the horizontal plane defined by the bottom 16. Similarly, the rearward end portion of the sheet material is turned upwardly coextensive with the side walls 18 and 20 to define a rearward wall 28. Spaced a predetermined distance forwardly of the back wall 28 a partition P extends transversely between the side walls 18 and 20 coextensive with their height and inclined upwardly and forwardly at an angle A, for example 60°, with respect to the plane of the bottom 16.

The purpose of the partition P is to define a seat area S between the back wall 28 and the partition P and provide a stop preventing forward movement relative to the frame of the buttocks and/or thighs of an individual when seated in the seat area with his feet facing forwardly.

The flexed leg supporting section 29 includes a rectangular leg and feet supporting panel 30 hingedly connected at its forward end to the inner surface of the upper forward edge portion of the front wall 26. The rearward end of the panel 30 is hingedly connected to a thigh or upper leg supporting panel 32 overlying the rearward surface of the partition P when in patient flexed leg supporting position.

The back portion 33 includes an elongated upright and rearwardly inclined flat back panel 34 integrally connected with a depending back/seat portion 36 having its lateral edge portions removably received slidably in slots 37, only one being shown (FIG. 4), formed by pairs of downwardly and forwardly inclined upwardly spaced-apart guides 38 and 40, only one pair being shown (FIG. 4), on the inner rearward end surface of the side walls 18 and 20.

Figure 5:
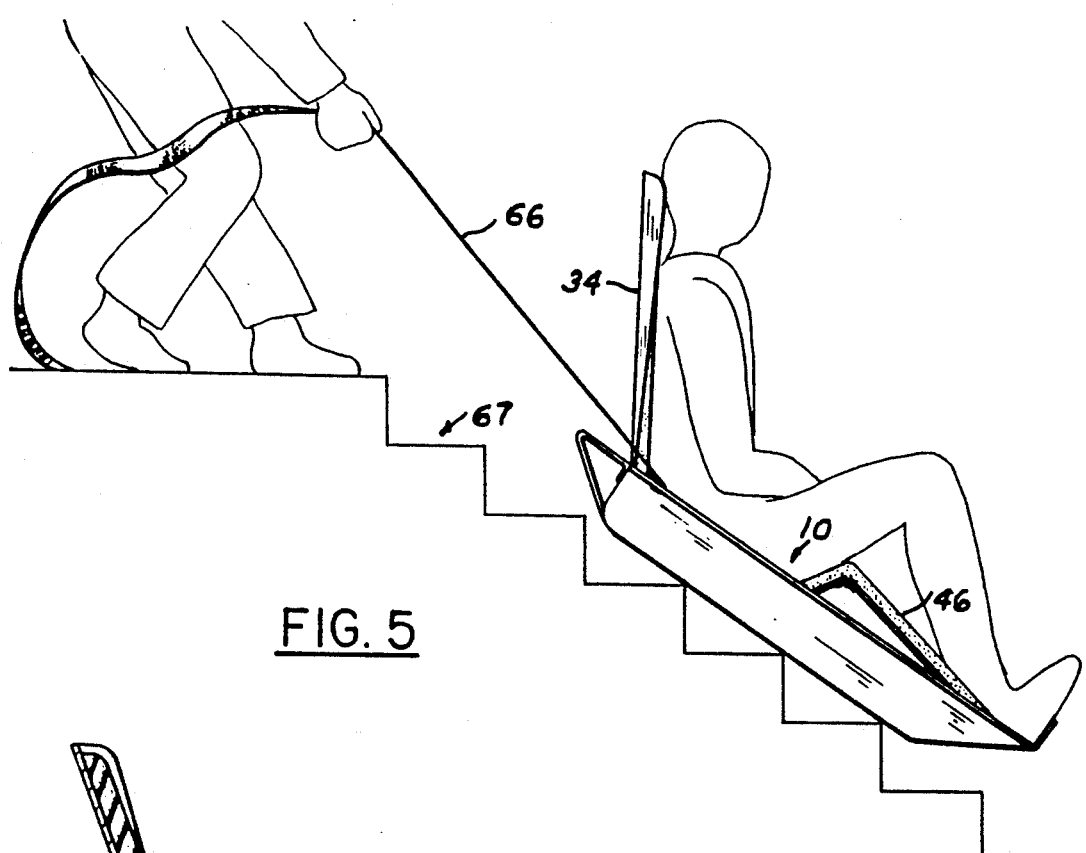
FIG. 5 is a side elevational view with patient restraining straps removed, illustrating the manner of an operator controlling the carriage when lowering a patient down a stairway; and, FIG. 6 is a perspective view when folded for transport or storage.

An intermediate folding seat panel 42 extends between and is hingedly connected, as at 44 and 47 with the depending forward edge of the of the back/seat panel 36 and an intermediate portion of the flexed leg panel 32. The combined dimensions of the panels 32, 36, and 42 longitudinally of the frame 12 is such that when disposed as illustrated by FIG. 2, the back panel is in occupant back supporting position and the panels 32, 36, and 42 support the buttocks and thighs while the panels 30 and 32 support the flexed legs and feet of an occupant (FIG. 5).

Figure 3:
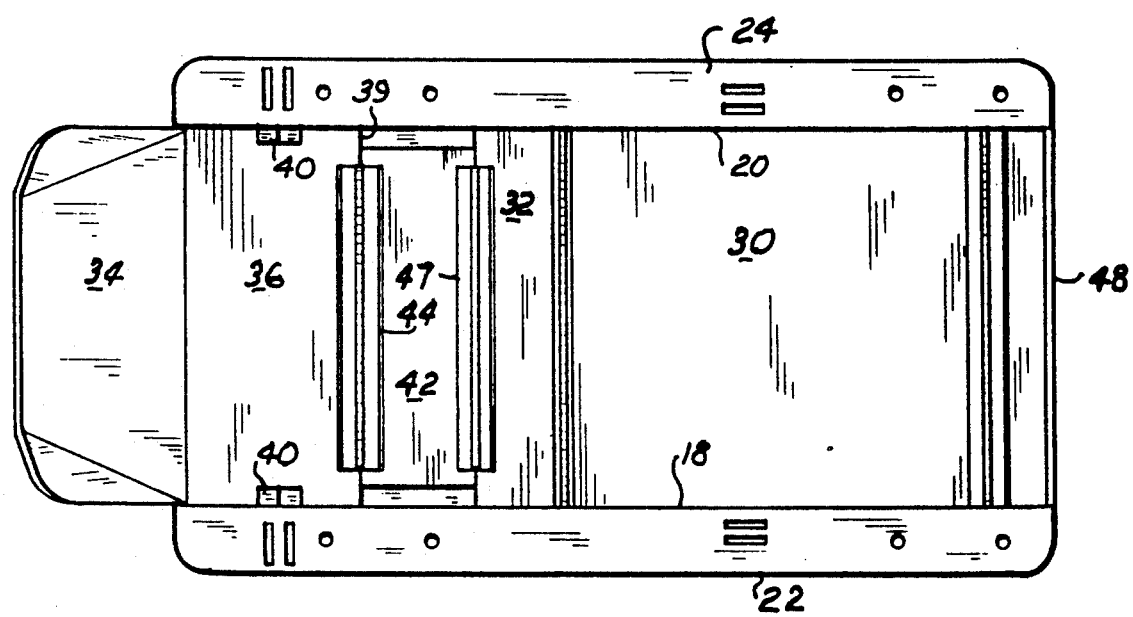
FIG. 3 is a top view of FIG. 2.

The longitudinal dimension of the intermediate seat panel 42 extending transversely between the side walls 18 and 20 is less than the inside dimension between these side walls a distance at least equal to twice the thickness of the guides 40 (FIG. 3).

Figure 4:
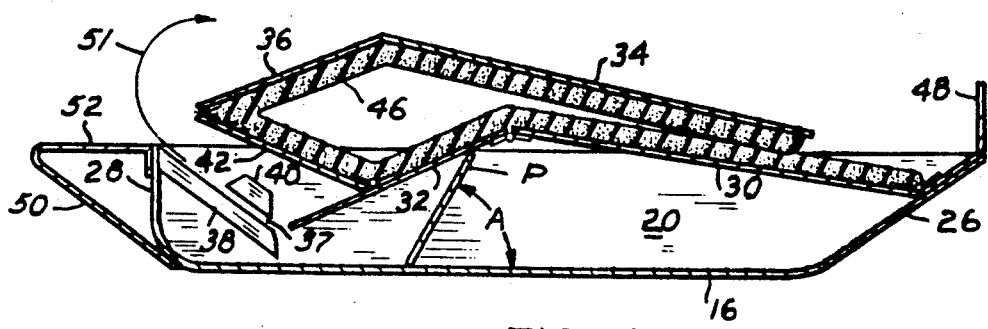
FIG. 4 is a view similar to FIG. 2 illustrating its folded position.

Therefore, when the depending end portion of the back, the seat panel 36, is moved upwardly and rearwardly until its depending edge 39 clears the rearward position of the slot forming guides 40 the panel 42 may be moved upwardly and forwardly between the slot forming guides 40. The back panel 34 and seat panels 36 and 42 may then be folded to an overlying collapsed position over the leg and thigh supporting panels 30 and 32 (FIG. 4).

Figure 1:
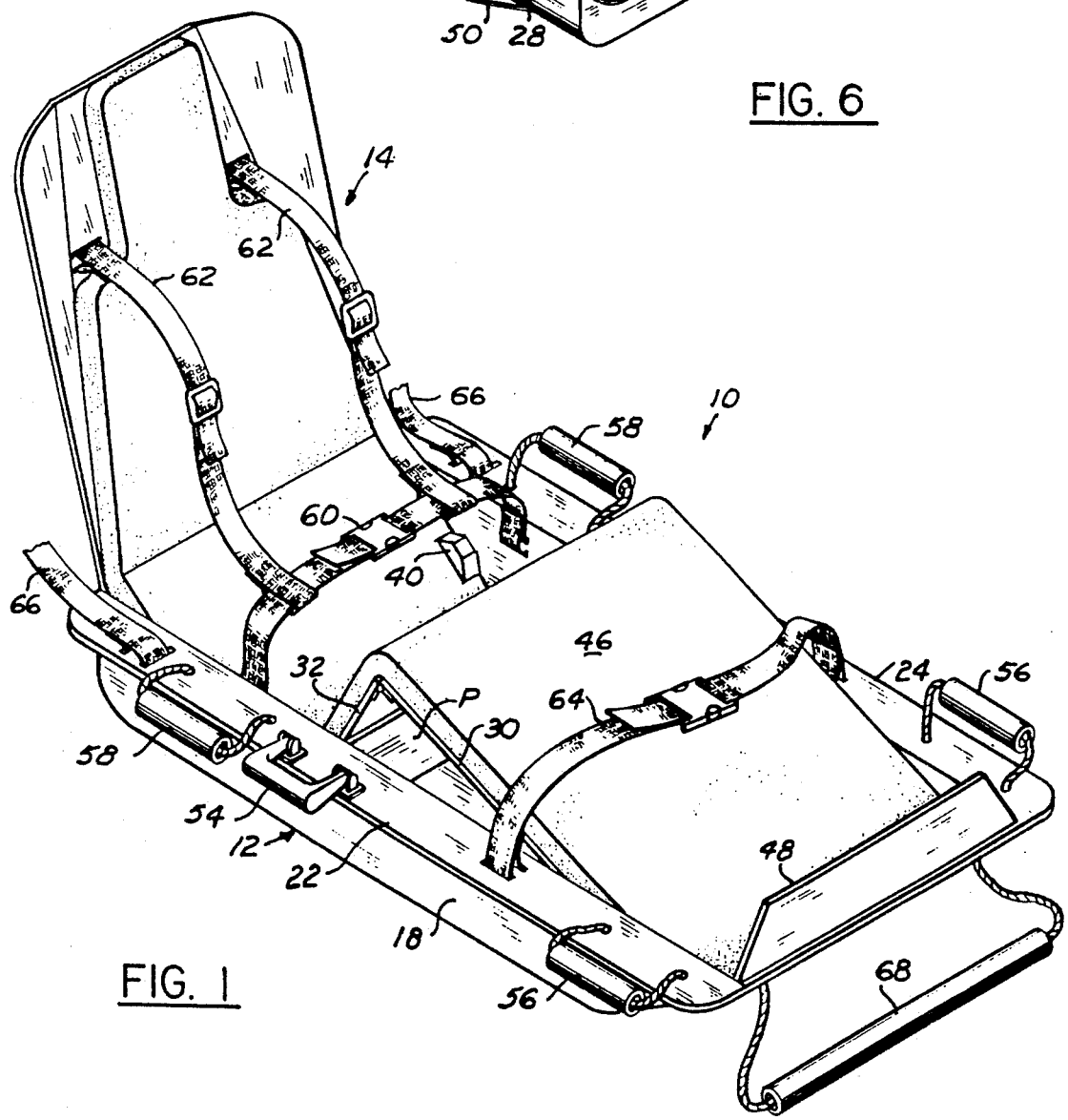
FIG. 1 is a perspective view of the carriage.
Figure 2:
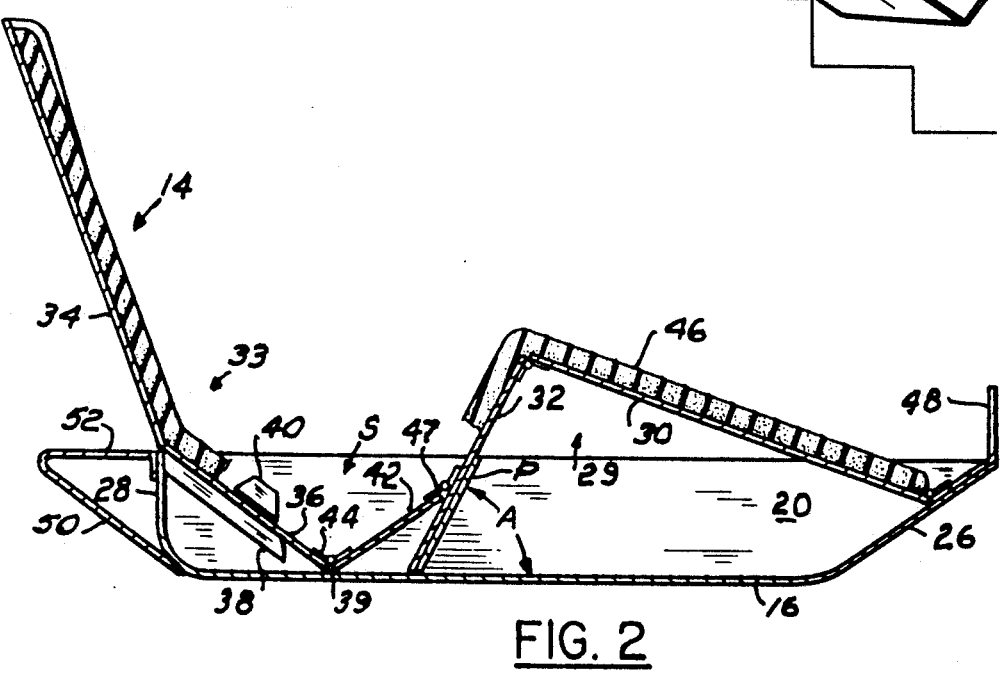
FIG. 2 is a longitudinal cross-sectional view with parts removed for clarity.

Conversely, when the seat panel 36 is to be again positioned in an occupant supporting position, as illustrated by FIGS. 1, 2 and 3, the seat back 34 and panel 36 are moved rearwardly and upwardly with respect to the sled until the depending edge 39 of the seat panel 36 is disposed rearwardly of the rearward limit of the slot forming guides 40, so that the depending edge of the seat panel 36 may enter the slots 37 formed by the pairs of guides 38 and 40, the hinged panel 42 is moved downward and rearwardly between the slot guides 40 to enable the panel 36 to move downwardly in the slots 37 until the depending edge 39 of the panel 36 contacts the inner surface of the bottom 16 in supporting relation (FIG. 2).

An elongated rectangular length of foam padding 46 overlies the back 34, seat portions 36 and 42 and leg portions 30 and 32. An upstanding transverse foot stop panel 48 secured to the forward wall 26 imparts additional security and safety to a patient when his feet are placed there against.

The rearward wall 28 of the frame is centrally provided with a bottom stair step descent panel 50 inclined upwardly and rearwardly from the bottom 16 to the plane defined by the upper limit of the side walls where a horizontal panel 52 joins the inclined panel 50 to the upper limit of the rearward wall for the purpose of easing the rearward end of the frame off the last or bottom step of a flight of stairs.

At its approximate center of gravity the carriage 12 is provided with a pair of handles 54 connected with the flanges 22 and 24 for lifting and carrying the device when not in use or in storage. Additionally, two pairs of forward and rearward handles 56 and 58 are connected with respective end portions of the flanges 22 and 24 for persons to carry a patient seated on the frame 12, when necessary.

A lap security strap 60 connected with the inner surfaces of the side walls 18 and 20 extends across the lap portion of a patient when seated in the seat area S and a pair of shoulder straps 62 connected with the back 34 and the lap strap 60 secure a patient to the back 34 when descending stairs. Additionally, a leg strap 64 connected with the flanges 22 and 24 extend across a patient's legs for descending a stairway.

An elongated restraining strap 66 connected at its respective ends to the rearward end portions of the flanges 22 and 24 is used by a helper (FIG. 5) acting as a brake in restraining the carriage 10 from sliding rapidly down a stairway 67 when moving a patient down the stairway. A pull strap or bar 68 connected with the forward end portion of the frame flanges is used by a second or the same helper in pulling the carriage 10 and a patient across a landing between stairs or any other flat surface.

When not in use and for storage, the seat and back portion 36 is moved out of the guide slots by lifting the back 34 rearwardly and upwardly which is then folded forwardly in the direction of the arrow 51 over the leg supporting portions 30 and 32, lowered by removing the back portion, to the position illustrated by FIG. 4. The restraining strap 66 is placed between the side walls and the leg strap 64 extended transversely across the folded down back to secure the entire unit (FIG. 6) in an easily transported or stored position.

Obviously the invention is susceptible to changes or alterations without defeating its practicability. Therefore, we do not wish to be confined to the preferred embodiment shown in the drawings and described herein.

We claim:

1. A stairway descending carriage for rescuing patients, comprising:

a rigid toboggan type frame having upright side walls, forward and rearward ends and a flat bottom;

partition means transversely dividing said frame for defining a rearward seat section;

a pair of elongated vertically spaced rearward and upwardly inclined slot forming guides secured in parallel relation to an inner surface of each of the side walls in cooperative aligned confronting relation transversely of the flat bottom and adjacent a rearward limit of the seat section;

seat and back support means including a normally upright elongated back supporting panel having a downward and forwardly inclined depending end portion slidably received at opposite side edge portions by the side wall guides for supporting contact at a depending edge with said flat bottom and forming a rearward portion of said seat section;

forward and rearward panel means extending between said partition means and the forward end of said frame for supporting the legs of a patient when in a flexed position; and, strap means connected with the frame for operator control of a rate of stairway descent.

2. The patient carriage according to claim 1 and further including:

intermediate seat section panel means extending between and hingedly connected to the forward panel means and the depending end portion for lifting and lowering the forward panel means to and from a flexed leg supporting position when the depending end portion is inserted into and removed from the guides, respectively.

3. The patient carriage according to claim 2 and further including:

a plurality of flexible strap means transversely connected with said frame for restraining a patient when seated thereon.

* * * * *